Jan. 7, 1964 C. C. WAUGH 3,116,749
INTERCONNECTED FLOW DISPLACEMENT ELEMENTS
FOR PROPORTIONING TWO FLUIDS
Filed Sept. 5, 1961 3 Sheets-Sheet 2

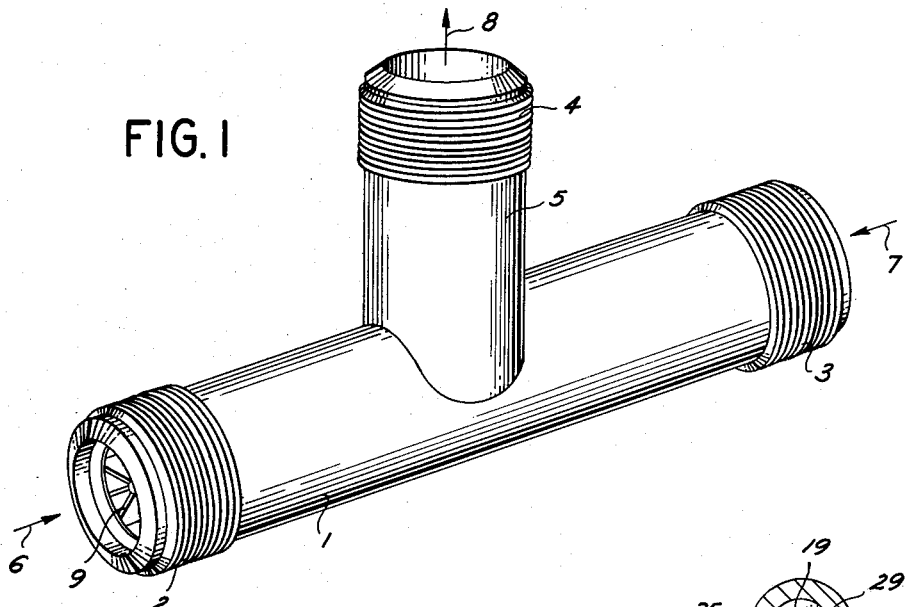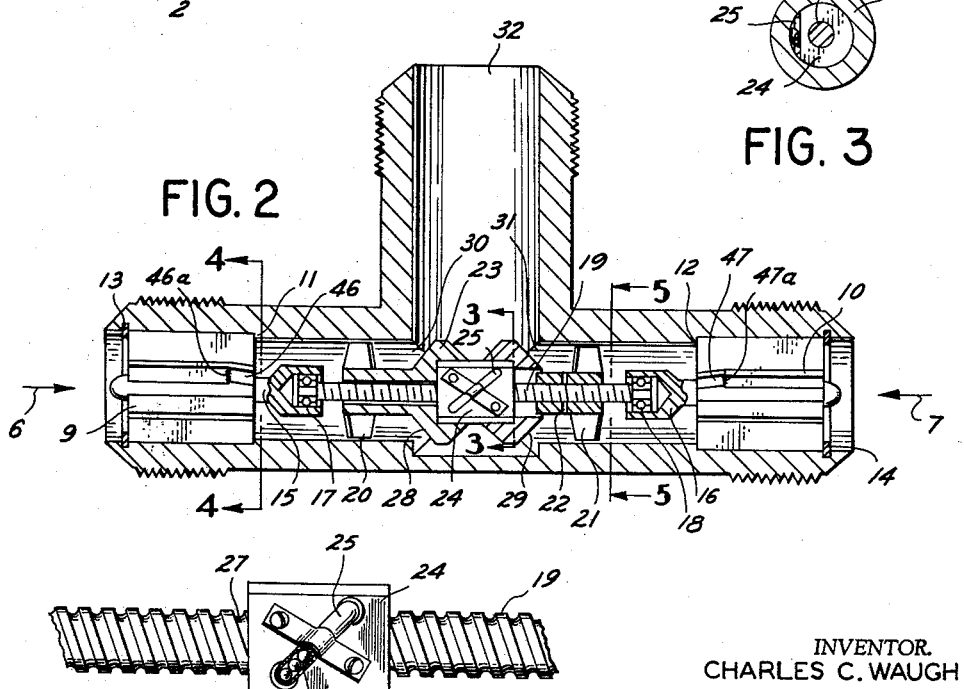

INVENTOR.
CHARLES C. WAUGH
BY R.E. Geauque
ATTORNEY

INVENTOR.
CHARLES C. WAUGH
BY R. E. Geanque
ATTORNEY

United States Patent Office

3,116,749
Patented Jan. 7, 1964

3,116,749
INTERCONNECTED FLOW DISPLACEMENT ELEMENTS FOR PROPORTIONING TWO FLUIDS
Charles C. Waugh, Tarzana, Calif., assignor to The Foxboro Company, Foxboro, Mass., a corporation of Massachusetts
Filed Sept. 5, 1961, Ser. No. 135,970
9 Claims. (Cl. 137—99)

This invention relates to flow control apparatus and more particularly to a flow control device which may be used to combine two fluid streams into a single stream, or, conversely, divide a single stream into two streams, in accordance with a fixed ratio.

There frequently exists in chemical processing, petroleum and aero-space industries, and in industries involved with transportation of fluids, the need to mix two or more fluids into a single flow stream in order to provide a blended fluid. Various devices have been proposed heretofore for accomplishing this function. Typical of these prior devices is the use of proportional control valves and regulating means therefore for introducing fluid from separate blend lines into a stock line. The regulating apparatus in these prior systems usually includes metering devices for measuring the quantity of fluid in the blend lines and/or the stock line. The outputs from the metering devices are used to control flow regulators, proportional control valves, etc. by means of suitable intermediate servomechanisms. These blend systems have been relatively complex, costly and difficult to maintain. To overcome these shortcomings of prior systems, there is provided by the present invention a novel unitary structure which performs the operations normally performed by the combination of separate devices and instrumentalities employed heretofore.

A novel feature, inherent in the present invention, is that it may be employed to perform the converse function of blending, namely the division of a single flow stream into separate flow streams, in accordance with a preselected ratio. For convenience in describing the structure and function of the novel apparatus of the invention, it will be discussed generally in terms of its use as a blender for mixing fluids, rather than the separation of a fluid stream into separate flow conduits.

Considered as a blender, the device of the present invention comprises a single housing containing a pair of inlet passages, each of which contains a flow metering turbine. The inlet passages communicate with a common outlet passage via a pair of variable orifices. The turbines are responsive to the total accumulated flow through each of the two inlets to adjust the relative areas of the two variable orifices, located therebetween, for maintaining an accurate proportionality between the two inlet flow streams and the flow through the outlet. The apparatus of the invention comprises a unitary structure capable of high accuracy together with high reliability under severe environmental conditions. This unitary structure is compact in size, light in weight, and may be constructed of materials which are compatible with a wide range of fluids.

It is therefore a principal object of the invention to provide a novel and improved device for blending fluids in each of a pair of input lines into a common output line in accordance with a predetermined blend ratio.

Another object of the invention is to provide novel means for dividing the fluid in an input conduit between a pair of output conduits, in accordance with a predetermined separation ratio.

Still another object of the invention is to provide novel and improved flow control apparatus for continuously maintaining a predetermined proportionality between the flows in a plurality of flow streams.

Yet another object of the invention is the improvement of flow blending apparatus generally.

A general object of the invention is to provide new and improved flow control apparatus which overcomes disadvantages of previous means and methods heretofore intended to accomplish generally similar purposes.

These and other objects of the invention will become more readily apparent upon consideration of the following specification taken in conjunction with the drawings, in which:

FIGURE 1 is a perspective view of a preferred embodiment of the invention.

FIGURE 2 is a longitudinal section view of the apparatus of FIGURE 1.

FIGURE 3 is a cross section view taken along line 3—3 of FIGURE 2.

FIGURE 12 is a fragmentary detail view of the ball-nut and screw mechanism employed in the apparatus of FIGURE 2.

Figure 4:
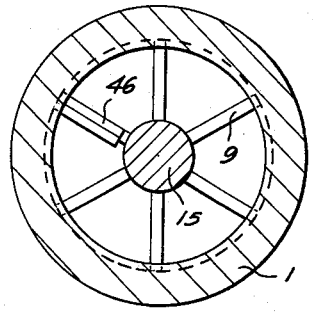
FIGURE 4 is a cross section view taken along line 4—4 of FIGURE 2.

Looking now at FIGURE 1, there is shown a typical embodiment of the apparatus in which the apparatus is enclosed within the generally tubular housing 1 having a pair of threaded inlet connections 2 and 3, and a threaded outlet connection 4 carried on a tubular extension 5 which is located midway between the inlets 1 and 2, and is perpendicular to housing 1. The connections shown are of the flared tube type but other suitable and well-known types of connections may be employed. Fluid enters through the two inlets flowing in the direction indicated by arrows 6 and 7 through conduits 30 and 31, respectively, and the combined fluids exit through conduit 31 and the common outlet in the direction shown by arrow 8.

The two inlets are provided with flow straighteners, one of which is shown at 9 in FIGURE 1, which serve to remove swirl or undesirable angular components from the incoming flow stream.

Referring now to FIGURE 2, each of the two inlet flow straighteners 9 and 10 comprises a plurality of radially disposed vanes which are held in abutting relationship with shoulders 11 and 12, respectively, by associated retaining rings 13 and 14. In the particular embodiment shown in FIGURES 1 and 2, each flow straightener comprises six radial vanes. It should be understood, however, that a greater or lesser number of vanes may be employed, as dictated by the requirements of a specific intended application. There will be shown hereinafter, in connection with the embodiments of FIGURES 8 through 11, flow straighteners employing only four vanes. A support shaft (15 and 16) is carried along the central axis of each of the flow straighteners 9 and 10, in coaxial alignment with the inlet flow conduits. Inwardly extended portions of shafts 15 and 16 are enlarged and each is provided with a receiving recess for holding the outer race of ball bearings 17 and 18, respectively.

Threaded shaft 19 extends between support shaft 15 and support shaft 16 and is rotatably supported by bearings 17 and 18. Turbines 20 and 21 (hereinafter also referred to as turbine rotors) are each comprised of a hub and blades which are mounted on common shaft 19, rotor 20 being free to turn relative to shaft 19, while rotor 21 is fixedly attached to shaft 19 by means of pin 22. Flow divider 23 comprises a spool-shaped member which is carried by ball-nut mechanism 24. Ball-nut 24 is threadedly supported on shaft 19 and is coupled for rotary motion directly with rotor 20. Details of the ball-nut mechanism 24 will be discussed hereinafter in connection with FIGURE 12. Ball-nut 24 in conjunction with the screw threads on shaft 19 converts rotary motion to linear motion, which motion is utilized to position flow divider 23. Looking now at FIGURE 12, ball-nut 24 and shaft 19 each have a concave helical ball race. The nut 24 is fitted with a tubular ball guide 25 which interrupts the path of the balls 26, deflects them from the helical race 27, guides them diagonally across the outside of the nut 24, and leads them back into the raceway 27. Thus, there is formed a closed circuit through which the rolling balls, as the medium of engagement between screw and nut, recirculate continually as the screw and nut are rotated relative to each other. The rotary motion imparted to the screw and/or the nut is thus changed to linear motion.

Spool-shaped flow divider 23 is of circular cross-section, as shown in FIGURE 3, and has beveled faces 28 and 29 which, in conjunction with the diametrical limits or bores of inlet flow conduits 30 and 31, respectively, define a pair of variable area orifices communicating with outlet conduit 32.

Rotors 20 and 21 may each have eight helical blades, spiraled in opposite directions, yet having identical leads. Rotor 20, which is directly linked to ball-nut 24, is spiraled to have counterclockwise rotation when the flow is in the direction indicated by arrow 6. Rotor 21 is spiraled to have clockwise rotation when the flow is in the direction of arrow 7.

If the flow rates in the two inlet conduits 30 and 31 are in accordance with the ration selected for the blender, the two rotors 20 and 21 will turn at exactly the same speed. When the flow conditions change, such that the ratio is higher or lower than desired, one rotor will turn faster than the other, thus causing the flow divider 23 to move to the right or left, as the case may be, along threaded shaft 19 until the correct balance between the flow rates in conduits 30 and 31 is re-established.

If it is desired to obtain a blend having other than a 1:1 ratio of the inlet fluids, the helical lead or pitch of the blades of one rotor may be changed, with respect to the other, to provide the desired ratio. Alternatively, the preselected flow ratio may be selected by varying the relative effective areas of the two rotors which intercept the flow stream. In this connection, it should be understood that the line connections to the two inlets need not be identical in size since the parameters dictated by a particular use may be varied to provide any desired blend ratio and/or other operating specifications, as will be obvious to those skilled in the art. In practical constructions, it has been shown that blend ratios ranging from 1:1 to 10:1 may be achieved. Such ranges should not, however, be construed as being limiting upon the invention. Also, reference to blending should not be construed as being limited to the mixing or blending of dissimilar fluids. For example, in aircraft weight and balance control, the fuel flow from two opposing wing tanks may be equalized by the device of the present invention. In such instance, the device is placed at the junction of two lines drawing fuel from each tank, thus combining the flows equally into a common fuel line leading to the powerplant.

The flow divider 23 may be controlled by any suitable differential mechanism in lieu of the ball-nut and screw mechanism shown. There exist a number of suitable differential devices having a pair of rotary input shafts and a mechanical output suitable for displacing the flow divider. Furthermore, the divider shown in the preferred embodiment comprises a spool-shaped member having conically-shaped ends which variably restrict or enlarge the bores of the inlet passages; however, other means for differentially adjusting the flow between the two input conduits and the output conduit, in response to the speeds of the turbine rotors, will suggest themselves to those skilled in the art.

Figure 6:
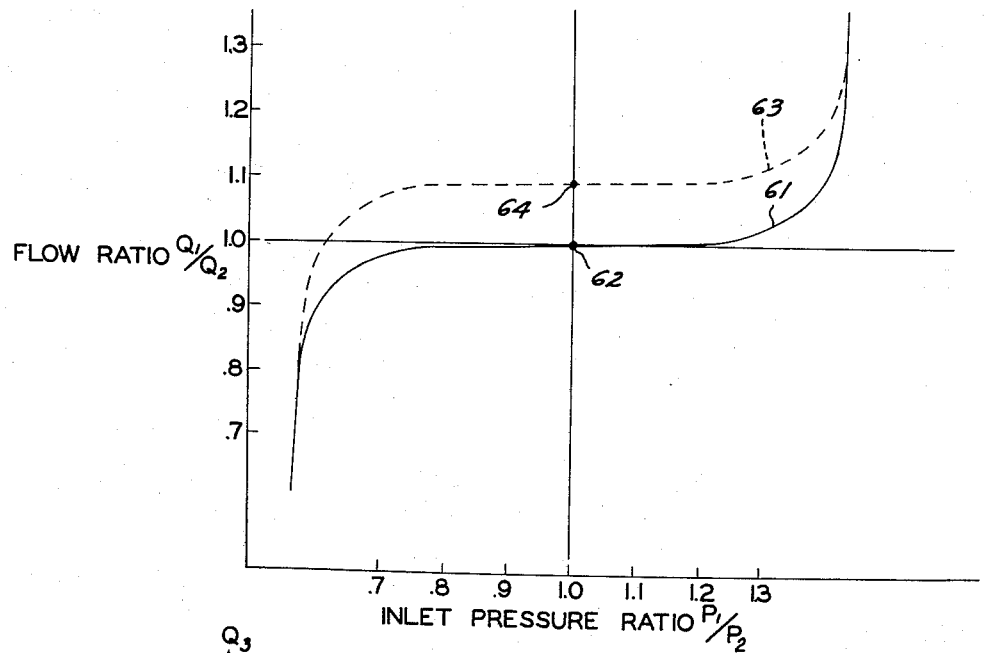
FIGURE 6 is a graphic representation of the input flow ratios plotted as a function of inlet pressure ratios.
Figure 7:
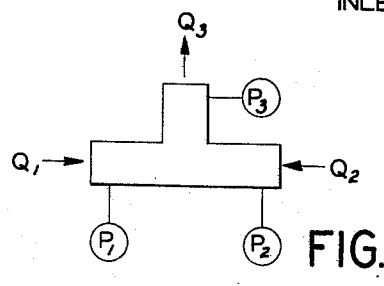
FIGURE 7 is a schematic diagram of the apparatus of FIGURE 2 useful in describing the relationship of the terms graphically illustrated in the plot of FIGURE 6.

With reference to FIGURES 6 and 7, there will now be discussed the operating characteristics of the device when the flow divider operates under various equilibrium conditions as required to maintain a preselected flow ratio.

FIGURE 6 graphically illustrates the relationship between the ratio of the quantities of fluid flowing in the two inlets, as indicated by $Q1/Q2$, and the ratio of the inlet pressures extant in the inlet conduits, as indicated by $P1/P2$. Referring to FIGURE 6, it is apparent that for a particular flow control device, the ratio of inlet pressures $P1/P2$ can vary over a considerable range without appreciably affecting the flow ratio $Q1/Q2$ since the central portion of the output curve is substantially linear and deviates only slightly from the horizontal. Thus, if the flow control device is constructed to maintain a flow ratio $Q1/Q2$ of unity under conditions in which pressures P1 and P2 are equal, curve 61 illustrates that slight variations in the pressure ratio $P1/P2$ will not substantially affect the flow ratio. The operating point when the quantity ratio is unity and the input pressures are equal is shown at 62.

It will be appreciated that if the device is constructed to produce a unity flow ratio with an inlet operating pressure ratio of 1:1, the output curve of the device may initially follow the dashed curve 63 rather than the full line curve 61 because of inaccuracies in construction. In such an instance, inlet pressures may be equal while the quantity ratio is other than unity as indicated, for example, by operating point 64. However, it is possible to make a simple adjustment in order to cause the device to perform along the full line curve 61. For example, compensating means, the detail structure of which is described hereinbelow, may be employed to result in the design operating curve as shown at 61. As will become apparent from consideration of the functioning of the compensating mechanism, various desired operating curves can be obtained.

Calibration and/or compensation of the apparatus to bring the device to operate in accordance with the designed flow ratio $(Q1/Q2)$ may be accomplished by means of trim tabs 46 and 47 located at the downstream or trailing edge of the flow straightener vanes. That is, the trailing edge of one or more of the flow straightening vanes may be bent or twisted about hinge lines 46a or 47a to impart a slight rotating flow trajectory to the fluid just prior to its impingement on the rotor. This angular component of the fluid stream will either add to, or retard, the rotor's rotational speed, depending on the direction of deflection imparted to the fluid by the tab. The operating curve may be shifted, as shown in FIGURE 6, by such trim tab means.

As is known to those versed in the art, a turbine flow metering element is responsive to volumetric flow rate rather than mass rate of flow. Inasmuch as an increase in the temperature of the metered fluid results in a reduction in fluid density, there is a corresponding decrease in the mass rate of flow which is not accompanied by a corresponding decrease in the volumetric flow rate. Thus, it becomes necessary to compensate volumetric flow measurements for temperature in order to obtain mass rate of flows. In one modification of the present invention, an automatic means for temperature compensation of a turbine element is provided to decrease its turbine speed in a predetermined manner whenever there is an increase in temperature. This will provide an accurate indication of mass rate of flow, of a given fluid regardless of changes in temperature. In this way, the flow control apparatus of the invention may be made responsive to mass rate of flow rather than volumetric flow rates. The modification comprises automatic trim tab regulating means for changing the turbine rotor speed as a function of changes in temperature of the fluid acting thereon.

Figure 8:
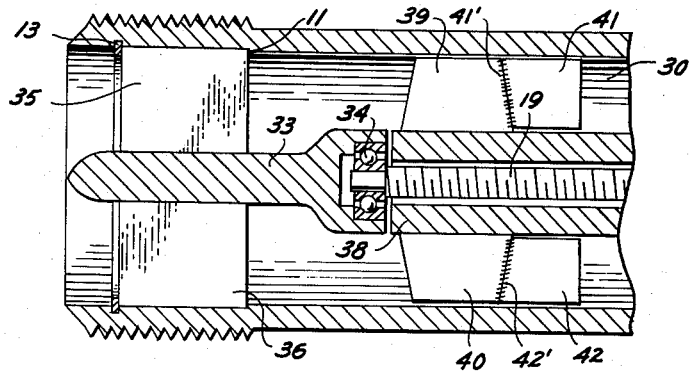
FIGURE 8 is a fragmentary sectional view showing a first modification of the apparatus of FIGURE 2 as used for temperature compensation.

The mechanism of FIGURE 8 is a modified turbine which may be installed in inlet conduit 30 in lieu of the turbine shown at 20 in FIGURE 2. It should be understood that a comparable modified turbine would also be installed in the other inlet conduit, namely conduit 31. In the apparatus of FIGURE 8, the upstream end of the turbine assembly is supported by support member 33 and bearing 34. Shaft 19 is rotatably supported by the inner race of bearing 34. Support member 33 is carried at the central axis of four straightening vanes, two of which are shown at 35 and 36 in FIGURE 8 and an additional one of which is shown at 37 in FIGURE 9. These vanes are circumferentially disposed in conduit 30 and are held in abutment with shoulder 11 by snap ring 13. The rotor blades are supported on hub 38 which is an integral part of flow divider 23.

Figure 5:
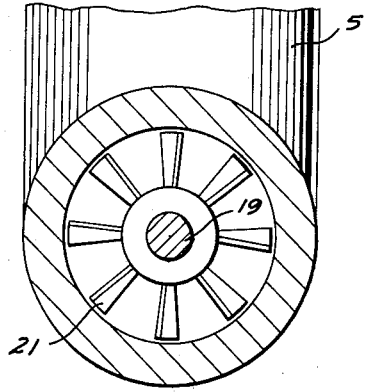
FIGURE 5 is a cross section view taken along line 5—5 of FIGURE 2.

In the modification shown in FIGURE 8, four turbine blades are employed, two of which are shown at 39 and 40, rather than the eight blades shown in FIGURES 2 and 5. The trailing edge or downstream end of each rotor blade (39, 40) carries a bimetallic extension tab (41, 42). These tabs are attached to the rotor blade, along bend lines 41' and 42', respectively.

Figure 9:
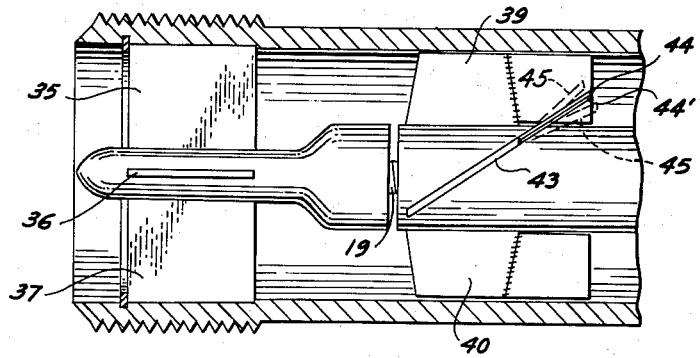
FIGURE 9 is a partial section of the apparatus of FIGURE 8 illustrating additional details thereof.

Looking now at FIGURE 9, there can be seen an edgewise view of rotor blade 43 and the bimetallic trim tab which comprises two metallic layers 44 and 44' having dissimilar coefficients of thermal expansion. At a given intermediate temperature, trim tab 44—44' assumes the position shown in solid outline. As the temperature changes either side of the intermediate temperature, trim tab 44—44' will bend or be turned upward or downward, depending on the direction of temperature change, to a position as shown in dotted outline at 45. The change in angle of the tab portion of the rotor blade will determine the effective lead of the turbine and will increase or decrease the rotor speed, for a given flow velocity, in proportion to a corresponding change in temperature.

Figure 10:
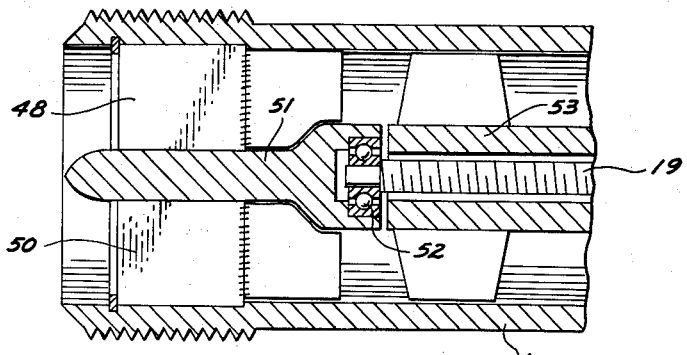
FIGURE 10 is a fragmentary cross section view showing a second modification of the apparatus of FIGURE 2, such modification being useful in controlling the apparatus in accordance with mass rate of flow.
Figure 11:
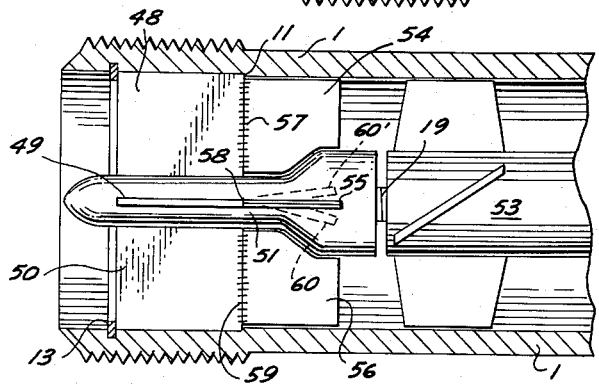
FIGURE 11 is a partial sectional view of the apparatus of FIGURE 10 illustrating additional details thereof.

It will be readily appreciated that bimetallic trim tabs may be applied to the straightening vanes upstream of the turbine rather than to the trailing edges of the rotor blades and still obtain substantially the same end effect, namely a variation in turbine speed as a function of change in temperature of the inlet fluid. Accordingly, there is shown in FIGURES 10 and 11 a modification of the invention in which bimetallic trim tabs are added to the downstream terminus of one or more straightening vanes. Looking now a FIGURES 10 and 11, four straightening vanes 48, 49, 50 (and one not shown) are held in housing 1 against shoulder 11 by retaining ring 13. The center axis of straightening vanes 48–50 carry support member 51. The extended portion of support member 51 is provided with a recess for receiving bearing 52 which rotatably carries the end of shaft 19. Turbine rotor 53 turns about shaft 19. Rotor 53 carries four helical rotor blades, rather than the eight blades of the turbine rotor shown in FIGURE 5, but it is otherwise the equivalent of the latter. Vanes 48, 49 and 50 carry bimetallic trim tabs 54, 55 and 60, respectively. The trim tabs are joined to vanes 48–50 along bend lines 57, 58 and 59, respectively, but are otherwise free to move with respect to other portions of the structure.

At a given intermediate temperature, the trim tab (e.g. 55) will be coplanar with the corresponding supporting vane (e.g. 49). With a change in inlet fluid temperature, the trim tab will be deflected upward or downward as shown in dotted outline at 60 and 60', thereby imparting an angular component to the moving fluid which will add to, or subtract from the rotational speed of rotor 53. By this means, the rotor is compensated to be responsive to mass rate of flow, for a given fluid, without regard to temperature changes. The characteristics of the materials from which the bimetallic tabs are fabricated may be selected to deflect the tab with changes in temperature in a manner which is linear with respect to changes in the density of the fluid resulting from temperature change. This linear relationship will permit the device to operate in response to mass flow rate.

While there have been shown and described and pointed out the fundamental novel features of the invention as applied to preferred embodiments, it will be understood that various omissions and substitutions and changes in the form and details of the devices illustrated and in their operation may be made by those skilled in the art, without departing from the spirit of the invention; therefore, it is intended that the invention be limited only as indicated by the scope of the following claims.

What is claimed is:

1. Fluid flow control apparatus comprising a hollow housing containing three passages meeting within said housing at a common junction point, each passage having a port for connection to an external flow conduit, a first turbine rotor rotatably mounted in a first one of said passages and a second turbine rotor rotatably mounted in a second one of said passages intermediate the common junction point and the port of each passage, flow control means located at said common junction point and movable to control the fluid flow in said first and second passages, and differential means connected with said flow control means and responsive to the speeds of said turbine rotors for positioning said flow control means to maintain a selected ratio between the fluid flow through said first and second passages.

2. Fluid flow control apparatus comprising a hollow housing having first, second and third ports and passage means therebetween, first turbine means mounted for rotation in said passage means and responsive to flow through said first port, second turbine means mounted for rotation in said passage means and responsive to flow through said second port, flow diverting means located in said passage means intermediate of said first and second ports for variably restricting the flow between said first and third ports and between said second and third ports, positioning means coupling said flow diverting means to said first and second turbine means whereby said flow diverting means is responsive to said first and second turbine means for controlling the relative areas in said passage means communicating said third port with said first port and with said second port in accordance with the relative flow through said first and second ports.

3. Fluid flow control apparatus as defined in claim 2 wherein said first and second ports are coaxially aligned and each having cross-sectional areas equal to one half of the cross-sectional area of said third port.

4. Fluid flow control apparatus as defined in claim 2 having flow straightening means disposed in said passage means adjacent said first and second ports, supporting means extending from said flow straightening means toward said flow diverting means, said turbine means being rotatably carried on said supporting means.

5. Fluid flow control apparatus as defined in claim 2 wherein said flow diverting means comprises differential means having first and second rotary inputs connected to corresponding ones of said turbine means and rectilinearly movable output means, said output means comprising conical shaped plug means for variably restricting the bores of the passage means containing said turbine means.

6. A fluid flow blender comprising a hollow housing containing two inlet passages and a common outlet passage meeting at a common junction, each of said inlet passages having a turbine rotor rotatably mounted therein, differential means located at said common junction and having two rotary input shafts and a rectilinearly movable output member, means connecting each of said input shafts with a corresponding one of said turbine rotors, and flow controlling means coupled to said output member for positioning said flow controlling means to maintain a preselected ratio between the fluid flow through said inlet passages into said outlet passage.

7. A fluid flow blender as defined in claim 6, having flow straightening means located in each of said inlet passages, bimetallic trim tab means associated with each of said flow straightening means, said trim tab means being deflected in response to changes in temperature in the fluid flowing in said inlet passages thereby imparting an angular component to said fluid for adjusting the speed of said turbine rotors in accordance with changes in temperature in the fluid in said passages.

8. A fluid flow blender as defined in claim 6, having bimetallic tab means attached to each of said turbine rotors, said tab means being deflected in response to changes in temperature for adjusting the speed of said turbine rotors in accordance with changes in temperature of the fluid in said inlet passages.

9. A fluid flow blender as defined in claim 6 having flow straightening means located in each of said inlet passages, trim tab means associated with at least one of said flow straightening means, said trim tab means extending angularly from said flow straightening means for imparting an angular component to said fluid for adjusting the speed of the turbine rotor downstream of said one flow straightening means by a preselected amount.

References Cited in the file of this patent

UNITED STATES PATENTS

| 1,345,934 | Knox | July 6, 1920 |
| 2,815,188 | Nelson | Dec. 3, 1957 |
| 2,983,279 | Biermann | May 9, 1961 |
| 2,988,327 | Trowbridge | June 13, 1961 |
| 3,033,219 | Erle | May 8, 1962 |